(12) United States Patent
Miyajima

(10) Patent No.: US 10,203,250 B2
(45) Date of Patent: Feb. 12, 2019

(54) TEMPERATURE CORRECTING DEVICE

(71) Applicant: DENSO WAVE INCORPORATED, Chita-gun, Aichi-pref. (JP)

(72) Inventor: Takahiro Miyajima, Nagoya (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 246 days.

(21) Appl. No.: 15/097,030

(22) Filed: Apr. 12, 2016

(65) Prior Publication Data
US 2016/0313190 A1   Oct. 27, 2016

(30) Foreign Application Priority Data

Apr. 23, 2015   (JP) .................................. 2015-088391

(51) Int. Cl.
*G01K 1/20* (2006.01)
*F24F 11/30* (2018.01)
*F24F 11/52* (2018.01)
*F24F 11/61* (2018.01)

(52) U.S. Cl.
CPC ................ *G01K 1/20* (2013.01); *F24F 11/30* (2018.01); *F24F 11/52* (2018.01); *F24F 11/61* (2018.01)

(58) Field of Classification Search
CPC ... G01K 1/20; F24F 11/30; F24F 11/52; F24F 11/61

USPC ..................... 374/1, 43, 141, 101, 102, 163
See application file for complete search history.

(56) References Cited

U.S. PATENT DOCUMENTS

| | | | | |
|---|---|---|---|---|
| 2006/0165149 A1* | 7/2006 | Kolk | ...................... | G01K 1/20 374/1 |
| 2014/0328368 A1* | 11/2014 | Niederberger | ........... | G01K 1/20 374/1 |

FOREIGN PATENT DOCUMENTS

| | | |
|---|---|---|
| JP | H07-113540 A | 5/1995 |
| JP | 2000-062432 A | 2/2000 |

* cited by examiner

*Primary Examiner* — Justin Seo
*Assistant Examiner* — John M Royston
(74) *Attorney, Agent, or Firm* — Oliff PLC

(57) ABSTRACT

A temperature correcting device includes: a power supply that supplies electric power to a terminal machine; a lapsed time obtain part that acquires a lapsed time after the power supply stops the supply of electric power; a temperature detector disposed in the terminal machine to detect a temperature inside the terminal machine as an internal temperature; and an external temperature estimation part that estimates a temperature out of the terminal machine as an external temperature by correcting the internal temperature using a temperature correction value which changes with the lapsed time.

3 Claims, 5 Drawing Sheets

TEMPERATURE CORRECTING DEVICE

CROSS REFERENCE TO RELATED APPLICATION

This application is based on Japanese Patent Application No. 2015-088391 filed on Apr. 23, 2015, the disclosure of which is incorporated herein by reference in its entirety.

TECHNICAL FIELD

The present disclosure relates to a temperature correcting device.

BACKGROUND

An apparatus such as air-conditioner includes a controlled object to be controlled, and a terminal machine which inputs various kinds of directions into the controlled object, which are provided separately from each other. When a target interior temperature is input into the terminal machine, the terminal machine outputs a corresponding target value to the controlled object. The terminal machine includes a temperature detector to detect the atmosphere temperature. Generally, the terminal machine is equipped with a casing housing a substrate in which the temperature detector is disposed. The temperature detected by the temperature detector is not an external temperature out of the terminal machine but an internal temperature inside of the casing.

The casing receives various kinds of heating elements including a calculation part or a lighting part. The temperature detected by the temperature detector is different from the external temperature out of the casing. Since there is a difference between the internal temperature and the external temperature, if the temperature detected by the temperature detector is used as it is, the control accuracy of the controlled object is low. JP H07-113540A describes that a detection temperature detected by a temperature detector is corrected after a temperature change of a heating element is finished.

SUMMARY

It is an object of the present disclosure to provide a temperature correcting device in which a detected temperature is accurately corrected at a timing immediately after a power supply is turned on.

According to an aspect of the present disclosure, a temperature correcting device that corrects a temperature detected in a terminal machine inputting information into a controlled object includes a power supply, a lapsed time obtain part, a temperature detector, and an external temperature estimation part. The power supply turns on or off electric power supplied to the terminal machine. The lapsed time obtain part acquires a lapsed time after the power supply turns off a supply of electric power. The temperature detector is disposed in the terminal machine to detect a temperature inside the terminal machine as an internal temperature. The external temperature estimation part estimates a temperature out of the terminal machine as an external temperature by correcting the internal temperature using a temperature correction value which changes with the lapsed time. When the supply of electric power is again turned on after the supply of electric power is turned off, the external temperature estimation part calculates the temperature correction value by correcting a stop-time correction value which is the temperature correction value when the supply of electric power is turned off, using the lapsed time and a thermal capacity around the temperature detector inside of the terminal machine.

Specifically, when the supply of electric power is again turned on after the supply of electric power is turned off, the external temperature estimation part calculates the temperature correction value according to the elapsed time elapsed after the supply of electric power is turned off. The external temperature estimation part acquires the temperature correction value when the supply of electric power is turned off as a stop-time correction value. The external temperature estimation part calculates the temperature correction value using the lapsed time and the thermal capacity around the temperature detector in the terminal machine, while the stop-time correction value is set an initial value. When the supply of electric power is turned off, the heating element stops heat generation, such that the heat emission amount decreases. Therefore, the temperature around the temperature detector inside the terminal machine falls with progress of time. The fall in the temperature is dependent on the lapsed time and the thermal capacity. The external temperature estimation part calculates the temperature correction value for correcting the temperature detected by the temperature detector in consideration of the heat emission amount which decreases with progress of time, while the temperature correction value at the time of turning off the supply of electric power is set as an initial value. Thereby, when the supply of electric power is turned on again, the external temperature estimation part estimates the temperature out of the terminal machine using the temperature correction value computed according to the lapsed time. Therefore, even at a timing immediately after turning on the supply of electric power, the detected temperature can be accurately corrected.

The heat amount emitted from the heating element changes depending on not only the supply of electric power but the state of the heating element. When the state of the heating element changes, the temperature of the heating element changes, and the temperature inside the terminal machine also changes. Therefore, a disagreement arises between the temperature out of the terminal unit and the temperature inside the terminal unit detected by the temperature detector.

According to an aspect of the present disclosure, a temperature correcting device that corrects a temperature detected in a terminal machine inputting information into a controlled object includes a temperature detector, a correlation value obtain part, and an external temperature estimation part. The temperature detector is disposed in the terminal machine to detect a temperature inside the terminal machine as an internal temperature. The correlation value obtain part acquires a correlation value correlated with a heat amount emitted from a heating element disposed in the terminal machine at a fixed time interval. The external temperature estimation part estimates a temperature out of the terminal machine as an external temperature by correcting the internal temperature using a temperature correction value based on the correlation value. The external temperature estimation part acquires the temperature correction value computed in a last processing as a last correction value. The external temperature estimation part sets a target correction value according to a newest correlation value of the temperature correction value obtained from the correlation value obtain part. The external temperature estimation part calculates the temperature correction value as a newest temperature correction value based on the last correction value, the target correction value, and a thermal capacity around the temperature detector in the terminal machine.

The external temperature estimation part calculates the newest temperature correction value based on the last correction value, the target correction value, and the thermal capacity. That is, the external temperature estimation part sets the target correction value according to the newest correlation value correlated with the heat amount emitted from the heating element acquired at the fixed time interval. In other words, the external temperature estimation part sets the target correction value that is a final correction value assumed relative to the newest correlation value. The external temperature estimation part calculates the newest temperature correction value based on the last temperature correction value computed in the last processing and the thermal capacity. Thus, the external temperature estimation part sets the target correction value from the correlation value correlated with the heat amount emitted from a heating element at a fixed time interval. The external temperature estimation part recalculates the newest temperature correction value by further correcting the last temperature correction value using the target correction value and the thermal capacity. Thereby, even when the state of the heating element changes, the newest temperature correction value follows the target correction value. Therefore, even when the correlation value correlated with the heat amount emitted from a heating element is changed, the detected temperature can be accurately corrected.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 2:
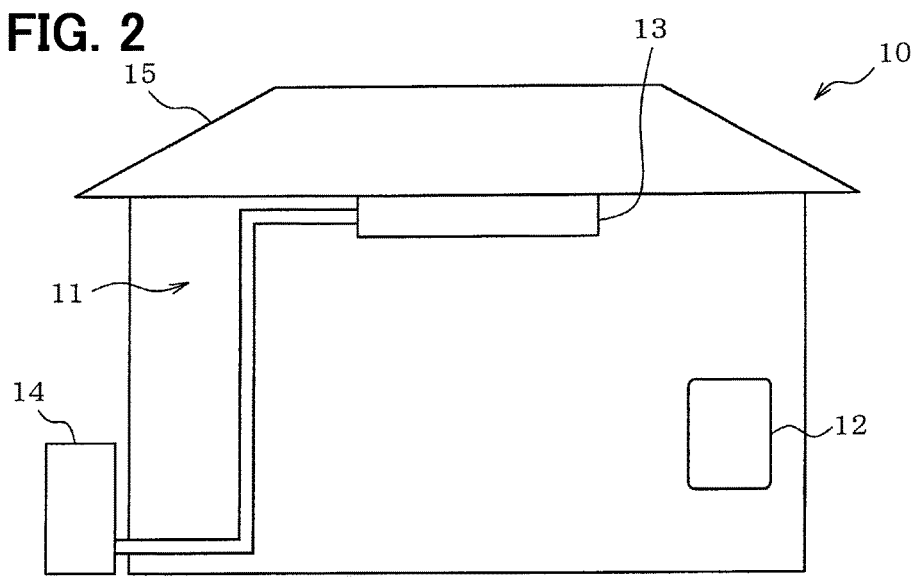
FIG. 2 is a schematic diagram illustrating a house to which the air-conditioning system is applied.

An air-conditioning system 10 is explained based on the drawings, to which a temperature correcting device 31 according to an embodiment is applied. As shown in FIG. 2, the air-conditioning system 10 includes an air-conditioning unit 11 and a terminal machine 12. The air-conditioning system 10 may correspond to an apparatus controller, and the air-conditioning unit 11 may correspond to a controlled object to be controlled. The controlled object is not limited to the air-conditioning unit 11, and may be other equipment that is controlled by the terminal machine 12. The air-conditioning unit 11 has an interior unit 13 and an exterior unit 14. The interior unit 13 is disposed inside of a building 15 such as house. The exterior unit 14 is disposed out of the building 15. The air-conditioning unit 11 has a heat pump with a heater and refrigerant. The air-conditioning unit 11 supplies warm air to the inside of the building 15 as a heating operation, and supplies cool air to the inside of the building 15 as a cooling operation.

Figure 3:
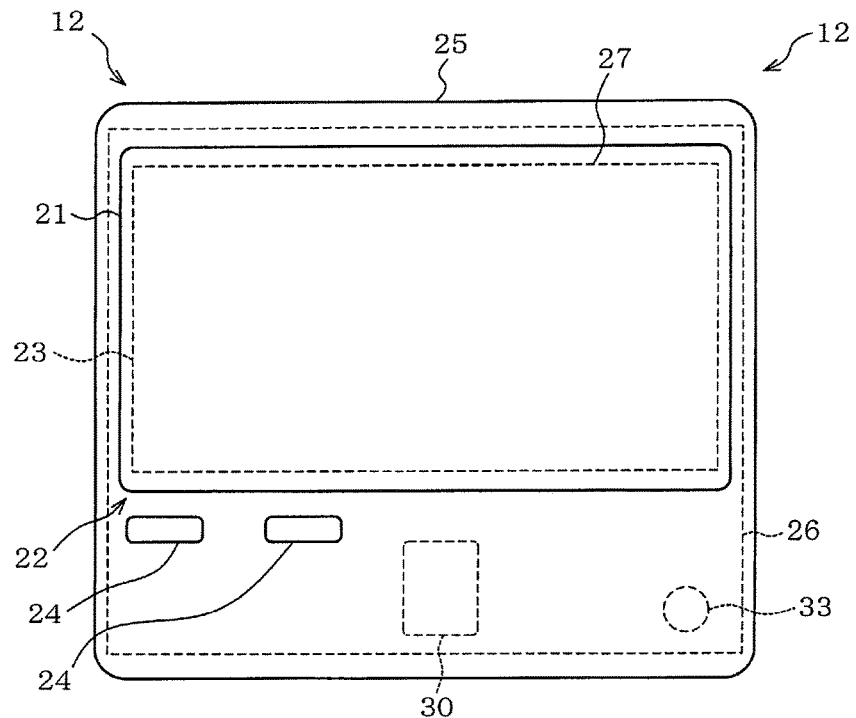
FIG. 3 is a schematic view illustrating the terminal machine.

The terminal machine 12 is disposed separately from the air-conditioning unit 11. The terminal machine 12 may be paired with the air-conditioning unit 11 as a special-purpose machine, and may be a general-purpose machine such as smart phone. As shown in FIG. 3, the terminal machine 12 has a display part 21 and an input unit 22. The display part 21 has a display such as liquid crystal or organic electroluminescence. The input unit 22 has a touch-panel switch 23 configured integrally with the display part 21. The input unit 22 is not limited to the touch-panel switch 23, and may have an input portion such as mechanical button switch 24 or rotary switch. A user inputs various kinds of information including preset temperature, operation time period, and the like of the air-conditioning system 10, which are required for controlling the air-conditioning system 10, from the input unit 22 of the terminal machine 12. The terminal machine 12 has a substrate 26 received in a casing 25. The display part 21 and the input unit 22 are connected to the substrate 26. The terminal machine 12 further has a lighting part 27 which illuminates the display part 21. The lighting part 27 may have LED illuminating the display part 21. For example, in a case of translucent type display, the lighting part 27 is disposed behind the display part 21. The terminal machine 12 further has a control part 30. The control part 30 is connected to the substrate 26, and has a chip of microcomputer with CPU, ROM, and RAM. The air-conditioning unit 11 and the terminal machine 12 are able to communicate with each other wirelessly or through a cable.

Figure 1:
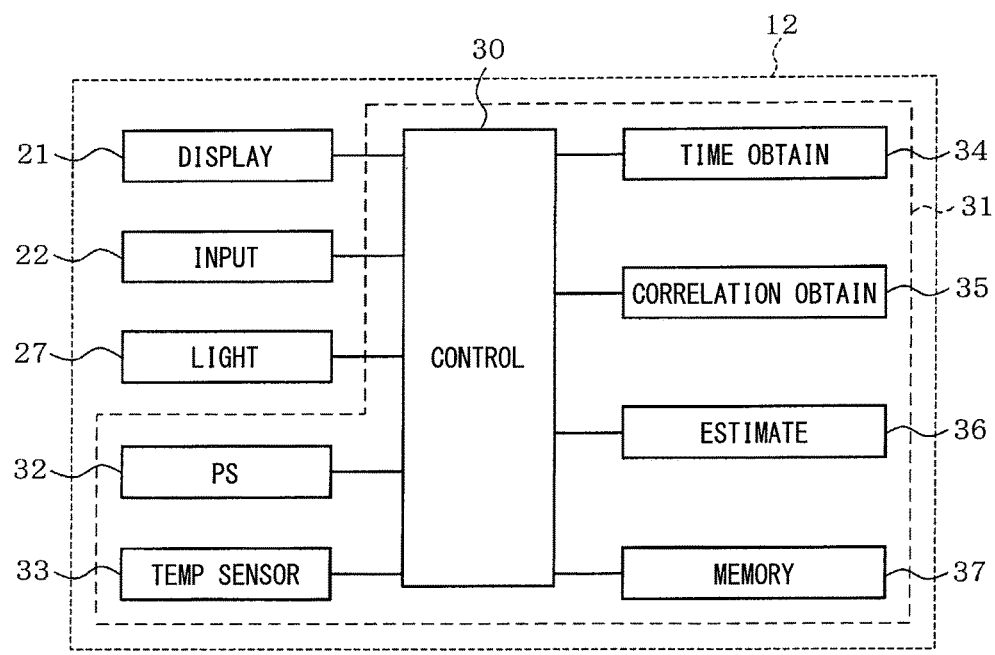
FIG. 1 is a block diagram illustrating a terminal machine of an air-conditioning system to which a temperature correcting device according to an embodiment is applied.

As shown in FIG. 1, the terminal machine 12 includes a temperature correcting device 31. The temperature correcting device 31 includes a power supply (PS) 32. The power supply 32 turns on or turns off the electric power supplied to the terminal machine 12. For example, in a case where the terminal machine 12 is fixed to the building 15, the power supply 32 turns on or turns off the electric power supplied from commercial power. In a case where the terminal machine 12 is a general-purpose machine such as smart phone, the power supply 32 turns on or turns off the electric power supplied from a battery (not shown).

The temperature correcting device 31 has the control part 30 and a temperature sensor 33 as a temperature detector. In this embodiment, the control part 30 of the temperature correcting device 31 is the same as the control part 30 of the terminal machine 12. The control part 30 of the temperature correcting device 31 may be defined separately from the control part 30 of the terminal machine 12. As shown in FIG. 3, the temperature sensor 33 is formed on the substrate 26 of the terminal machine 12. The temperature sensor 33 detects a temperature inside of the casing 25 of the terminal machine 12 as an internal temperature Ti. The temperature sensor 33 outputs the internal temperature Ti to the control part 30 as an electric signal.

As shown in FIG. 1, the temperature correcting device 31 has a lapsed time obtain part 34, a correlation value obtain part 35, and an external temperature estimation part 36, which are realized by software by executing a computer program in the control part 30. The lapsed time obtain part 34, the correlation value obtain part 35, and the external temperature estimation part 36 may be realized in hardware, or in a collaboration with software and hardware. The temperature correcting device 31 has a storage part 37. The storage part 37 has a non-volatile memory such as EEPROM. The storage part 37 may correspond to ROM and RAM of the control part 30.

The lapsed time obtain part 34 acquires a lapsed time t. Specifically, the lapsed time obtain part 34 acquires the lapsed time t that is defined from when the electric power supplied to the terminal machine 12 is turned off by the power supply 32. The lapsed time obtain part 34 memorizes an OFF time when the supply of electric power is turned off, for example, to the storage part 37. The lapsed time obtain part 34 calculates the lapsed time t based on an ON time when the supply of electric power is turned on by the power supply 32 and the OFF time memorized in the storage part 37. The power supply 32 supplies minimum electric power, even when the supply of electric power to the terminal machine 12 is turned off, for maintaining the function such as the obtain of the lapsed time t by the lapsed time obtain part 34. The lapsed time obtain part 34 may access the Internet etc. to acquire the current time on the network, for computing the lapsed time t.

The correlation value obtain part 35 acquires a correlation value correlated with a heat amount emitted from a heating element. The terminal machine 12 has the heating element such as the lighting part 27 and the control part 30 inside the casing 25. For example, the lighting part 27 emits heat by generating the light which illuminates the display part 21. The control part 30 emits heat by repeating the calculations. The battery of the terminal machine 12 emits heat by charge or discharge. Thus, the heating elements are held inside of the casing 25. The heat emitted from the heating element affects the internal temperature Ti detected by the temperature sensor 33. Since the temperature sensor 33 is disposed inside of the casing 25, the internal temperature Ti detected by the temperature sensor 33 becomes different, due to the heat emitted from the heating element, from the external temperature To out of the terminal machine 12 which should be detected.

The correlation value obtain part 35 acquires the correlation value correlated with the heat amount emitted from the heating element which affects the internal temperature Ti. For example, when the lighting part 27 illuminates the display part 21 as the heating element, the heat emission amount changes with the luminosity of the lighting part 27. The correlation value obtain part 35 acquires an instruction value instructing the luminosity of the lighting part 27 as a correlation value. In this embodiment, the instruction value of the luminosity of the lighting part 27 is used as a correlation value. The correlation value may be, for example, current supplied to the lighting part 27, the number of calculation processes of the control part 30, and/or the charging current of the battery. Thus, inside of the terminal machine 12, various elements function as the heating element. The correlation value obtain part 35 acquires various kinds of values correlated with the heat amount emitted from the heating element. In this case, the correlation value obtain part 35 may directly acquire the temperature and the heat amount emitted from the heating element as a correlation value. In this embodiment, the lighting part 27 is explained as a heating element, and the instruction value V instructing the luminosity of the lighting part 27 is explained as a correlation value.

The external temperature estimation part 36 corrects the internal temperature Ti detected by the temperature sensor 33 with a temperature correction value Os, and estimates the temperature out of the terminal machine 12 as an external temperature To. In this embodiment, the external temperature estimation part 36 estimates the external temperature To in a staring process and a changing process.

Figure 4:
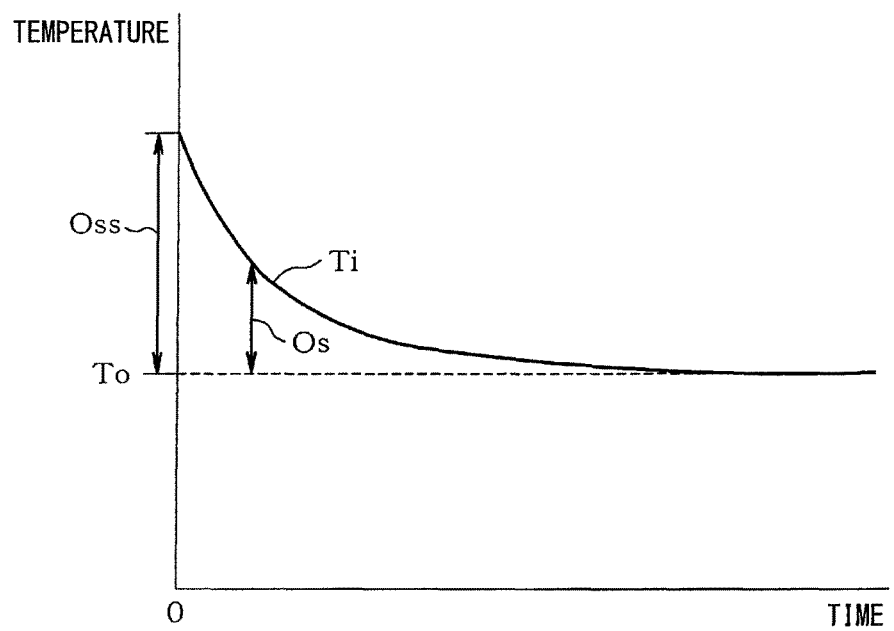
FIG. 4 is a time chart showing an internal temperature when supply of electric power to the terminal machine is turned off.

The starting process is performed when the supply of the electric power to the terminal machine 12 is turned on again after the supply of the electric power to the terminal machine 12 is turned off. When the supply of the electric power to the terminal machine 12 is turned off, the heat amount emitted from the heating element inside of the terminal machine 12 decreases. Therefore, as shown in FIG. 4, the internal temperature Ti inside of the terminal machine 12 falls with the lapsed time t, and becomes approximately equal to the external temperature To finally. The external temperature estimation part 36 calculates the temperature correction value Os to correspond to the internal temperature Ti lowered with the lapsed time t. The external temperature estimation part 36 estimates the external temperature To by correcting the internal temperature Ti with the temperature correction value Os.

In detail, the external temperature estimation part 36 defines a stop-time correction value Oss by the temperature correction value Os acquired when the supply of the electric power to the terminal machine 12 is turned off. The external temperature estimation part 36 calculates the temperature correction value Os by using the lapsed time t and a thermal capacity M while the stop-time correction value Oss is an initial value. The thermal capacity M is a thermal capacity preset around the substrate 26 on which the temperature sensor 33 is formed. As the thermal capacity M is smaller, the change in the internal temperature Ti detected by the temperature sensor 33 relative to the lapsed time t becomes larger. A the thermal capacity M is larger, the change in the internal temperature Ti relative to the lapsed time t becomes smaller. The thermal capacity M is acquired as a value peculiar to the terminal machine 12. The thermal capacity M is memorized by the storage part 37. The external temperature estimation part 36 calculates the temperature correction value Os by applying the stop-time correction value Oss, the lapsed time t, and the thermal capacity M to Formula 1.

$$Os = Oss \times (e^{-t/m \times 5}) \qquad \text{(Formula 1)}$$

In Formula 1, e is a natural logarithm. Formula 1 is an example in this embodiment and can be suitably set according to the terminal machine 12. The external temperature estimation part 36 calculates the temperature correction value Os which changes with the lapsed time t by using Formula 1. The external temperature estimation part 36 corrects the internal temperature Ti detected by the temperature sensor 33 using the computed temperature correction value Os. Thereby, the external temperature estimation part 36 estimates the external temperature To as a value where the internal temperature Ti detected by the temperature sensor 33 is corrected with the temperature correction value Os. In FIG. 4, the external temperature To may correspond to air temperature. Therefore, the temperature correction value Os may correspond to a difference between the internal temperature Ti and the external temperature To.

The changing process is performed in order to correspond to change in a correlation value, when the electric power is supplied to the terminal machine 12. The external temperature estimation part 36 regularly performs the changing process during which the supply of the electric power to the terminal machine 12 is turned on. In the changing process, the correlation value obtain part 35 acquires a correlation value periodically at a fixed time interval dt set beforehand. When the correlation value of the heating element of the terminal machine 12 is changed, the heat amount emitted from the heating element changes.

In recent years, the lighting part 27 which illuminates the display part 21 is turned on when an instruction is input into the input unit 22. When a predetermined time period passes after the input is ended, the lighting part 27 is turned off automatically for reducing the power consumption. Moreover, luminosity of the lighting part 27 of the display part 21 is changed suitably if needed for a user. Therefore, when the luminosity of the lighting part 27 is changed, the instruction value V which is a correlation value of luminosity changes.

Figure 5:
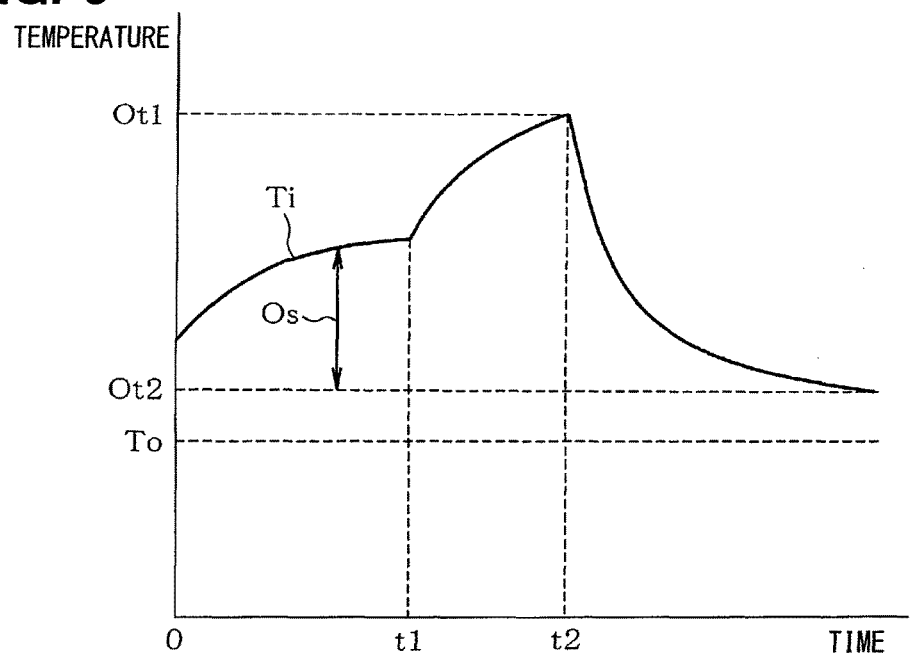
FIG. 5 is a time chart showing an internal temperature when a luminosity of a lighting part of the terminal machine changes.

As a result, as shown in FIG. 5, the internal temperature Ti inside of the terminal machine 12 changes with time, when the luminosity is changed. At this time, the internal temperature Ti does not quickly change according to the change in the luminosity, but gradually approaches a temperature according to the changed luminosity with time.

The external temperature estimation part 36 calculates the temperature correction value Os to correspond to the internal temperature Ti continuously changed by the luminosity of the lighting part 27. The external temperature estimation part 36 estimates the external temperature To by correcting the internal temperature Ti with the temperature correction value Os.

In FIG. 5, the external temperature To may correspond to air temperature. Therefore, the temperature correction value Os may correspond to a difference between the internal temperature Ti and the external temperature To. In FIG. 5, when the luminosity starts increasing at a time t1, a target correction value Ot1 is set according to the changed luminosity. When the luminosity starts decreasing at a time t2, a target correction value Ot2 is set according to the changed luminosity. Thus, the external temperature estimation part 36 updates the target correction value Ot, when the instruction value V of the luminosity changes.

In detail, the external temperature estimation part 36 acquires the temperature correction value Os computed in the last processing as a last correction value Osp, while the changing process is repeatedly performed. The correction value Osp is the temperature correction value Os computed in the last processing of the changing process. The temperature correction value Os computed in this last processing is memorized by the storage part 37 as the last correction value Osp in the last processing. The external temperature estimation part 36 acquires the last correction value Osp by reading the last correction value Osp in the storage part 37.

The external temperature estimation part 36 sets the target correction value Ot according to this newest correlation value acquired from the correlation value obtain part 35. That is, the external temperature estimation part 36 acquires the newest correlation value in the present processing from the correlation value obtain part 35. In this embodiment, the external temperature estimation part 36 acquires the instruction value V equivalent to the newest luminosity of the lighting part 27. The target correction value Ot changes according to the instruction value V of the luminosity of the lighting part 27.

For example, when the luminosity of the lighting part 27 increases, since the heat amount emitted from the lighting part 27 becomes large, the target correction value Ot changes to raise the temperature. When the luminosity of the lighting part 27 reduces, since the heat amount emitted from the lighting part 27 decreases, the target correction value Ot changes to lower the temperature. Thus, the target correction value Ot is determined based on the instruction value V of the luminosity of the lighting part 27. In this case, the external temperature estimation part 36 may set the target correction value Ot by considering the heat amount emitted from the substrate 26 including the lighting part 27, not only based on the instruction value V of luminosity.

The external temperature estimation part 36 calculates a newest temperature correction value Os from the last correction value Osp, the target correction value Ot, and the thermal capacity M. The thermal capacity M is memorized by the storage part 37 as a value peculiar to the terminal machine 12 as mentioned above. The external temperature estimation part 36 calculates the newest temperature correction value Os, i.e., the temperature correction value Os in the present processing, using Formula 2.

$$Os = Osp + (Ot - Osp)/M \qquad \text{(Formula 2)}$$

The external temperature estimation part 36 calculates the temperature correction value Os at the fixed time interval dt using Formula 2. The external temperature estimation part 36 corrects the internal temperature Ti detected by the temperature sensor 33 using the computed temperature correction value Os. Thereby, the external temperature estimation part 36 estimates the external temperature To by correcting the internal temperature Ti detected by the temperature sensor 33 with the temperature correction value Os. The external temperature estimation part 36 memorizes the computed newest temperature correction value Os to the storage part 37 as the last correction value Osp which will be used in the next processing.

Figure 6:
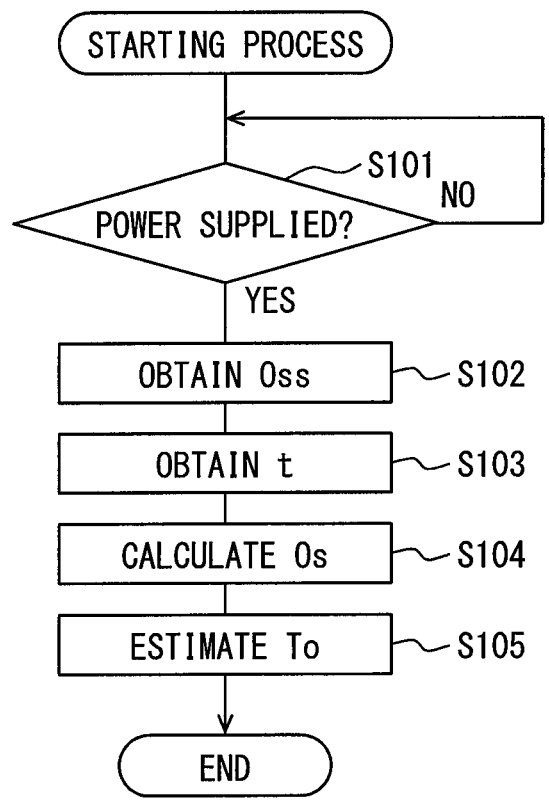
FIG. 6 is a flow chart of a starting process in the temperature correcting device.

Next, the processing flow of the temperature correcting device 31 is explained. The starting process is described based on FIG. 6. The starting process is performed when the supply of the electric power to the terminal machine 12 is turned on. The supply of electric power to the terminal machine 12 is repeatedly turned on and off. Then, the starting process is performed when the terminal machine 12 is turned on again, after the supply of the electric power to the terminal machine 12 is turned off.

The external temperature estimation part 36 determines whether the supply of the electric power to the terminal machine 12 by the power supply 32 is turned on (S101). Even when the main supply of the electric power is turned off, the electric power is supplied to the terminal machine 12 for maintaining a minimum function. The external temperature estimation part 36 determines whether the main supply of the electric power is turned on. When the supply of electric power is not turned on (S101: No), the external temperature estimation part 36 stands by until the supply of electric power is turned on.

When the external temperature estimation part 36 determines that the supply of the electric power to the terminal machine 12 is turned on (S101: Yes), the external temperature estimation part 36 acquires the stop-time correction value Oss (S102). Specifically, the external temperature estimation part 36 reads the stop-time correction value Oss memorized by the storage part 37. The storage part 37 memorizes the temperature correction value Os set when the power supply 32 turns off the supply of the electric power to the terminal machine 12, as the stop-time correction value Oss. The external temperature estimation part 36 acquires the stop-time correction value Oss memorized by the storage part 37, when the supply of the electric power is turned off.

The external temperature estimation part 36 acquires the lapsed time t (S103). Specifically, the external temperature estimation part 36 acquires the lapsed time t from the lapsed time obtain part 34. The lapsed time obtain part 34 acquires the lapsed time t defined from when the supply of the electric power to the terminal machine 12 is turned off by the power supply 32 to when it is determined that the supply of electric power is turned on in S101. In detail, the lapsed time obtain part 34 memorizes the OFF time when the supply of electric power is turned off to the storage part 37. The lapsed time obtain part 34 calculates the lapsed time t using the ON time when the supply of electric power is turned on by the power supply 32 and the OFF time memorized by the storage part 37.

The external temperature estimation part 36 calculates the temperature correction value Os using the stop-time correction values Oss acquired in S102, the lapsed time t acquired in S103, and the thermal capacity M (S104). The thermal capacity M is memorized by the storage part 37 as a value peculiar to the terminal machine 12. The external temperature estimation part 36 reads the thermal capacity M in the storage part 37 and calculates the temperature correction value Os. The temperature correction value Os is computed using Formula 1. That is, the temperature correction value Os is computed as a function of the lapsed time t, in which the stop-time correction value Oss is an initial value and the thermal capacity M is a constant.

The external temperature estimation part 36 estimates the external temperature To at S105, which is the exterior temperature of the terminal machine 12, using the temperature correction value Os computed in S104. That is, the internal temperature Ti detected by the temperature sensor 33 is corrected with the temperature correction value Os computed in S104, and the external temperature estimation part 36 estimates it as the external temperature To.

Thereby, the external temperature To at the starting time where the supply of the electric power to the terminal machine 12 is turned on is estimated in consideration of the temperature correction value Os which changes with the lapsed time t. The terminal machine 12 controls the air-conditioning unit 11 at the starting time using the external temperature To that is estimated by the external temperature estimation part 36 in S105.

Figure 7:
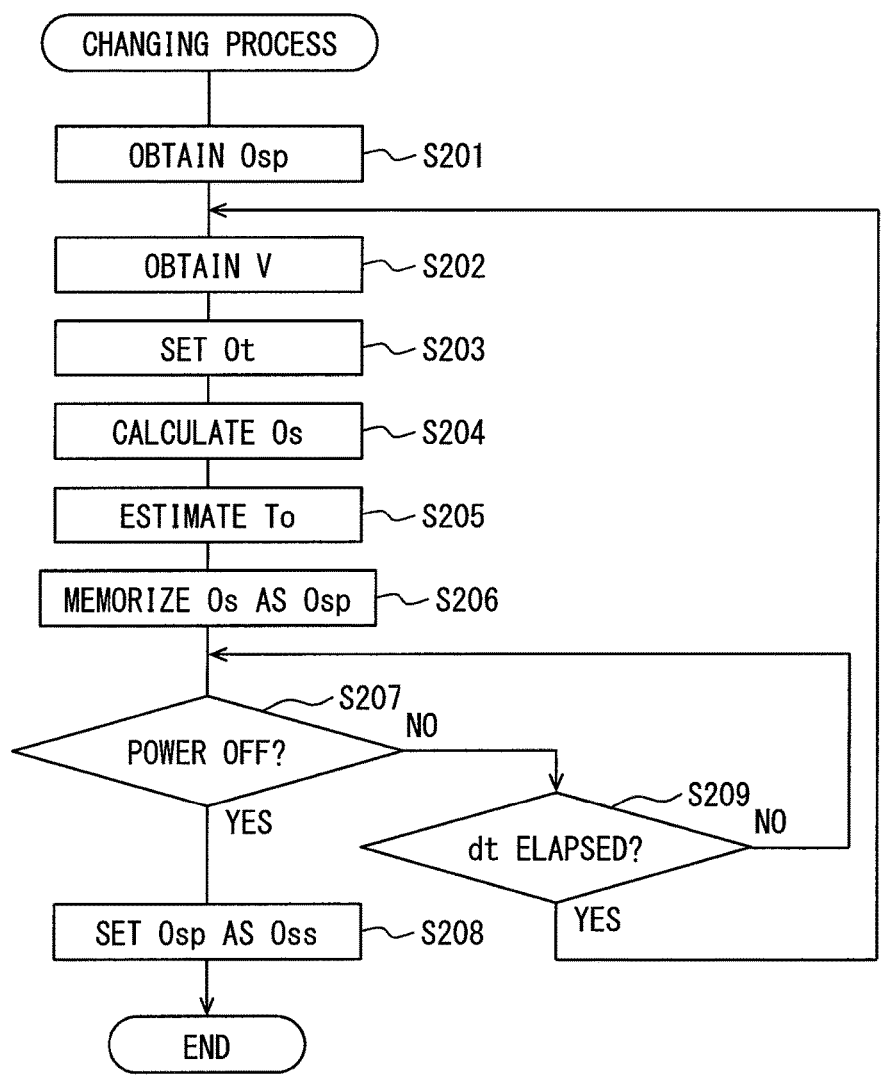
FIG. 7 is a flow chart of a changing process in the temperature correcting device

When the starting process is completed, the external temperature estimation part 36 shifts to a changing process shown in FIG. 7. As mentioned above, the starting process is conducted when the supply of the electric power to the terminal machine 12 is turned on again after the supply of the electric power of the terminal machine 12 is turned off. In detail, in the starting process, the temperature correction value Os depending on the lapsed time t after the terminal machine 12 is turned off is computed, such that a difference between the internal temperature Ti detected by the temperature sensor 33 and the external temperature To is eliminated at the starting time when the supply of the electric power of the terminal machine 12 is turned on.

When the starting process is completed and when the terminal machine 12 shifts to a normal operational status, the temperature correction value Os changes depending on the heat amount emitted from the heating element in the terminal machine 12. Then, the external temperature estimation part 36 calculates the temperature correction value Os in accordance with the state of a heating element in the terminal machine 12, when the starting process is completed.

The external temperature estimation part 36 shifts to the changing process, and acquires the last correction value Osp (S201). The external temperature estimation part 36 acquires the last correction value Osp which is memorized by the storage part 37. The last correction value Osp is the temperature correction value Os computed in the previous processing while the changing process is repeated at the fixed time interval dt. That is, when the external temperature estimation part 36 performs the changing process, the external temperature estimation part 36 calculates the temperature correction value Os, and the computed temperature correction value Os is memorized to the storage part 37 as the last correction value Osp which will be used in the next changing process. Moreover, when the external temperature estimation part 36 shifts from the staring process to the changing process, the last correction value Osp is the temperature correction value Os computed in S104 of FIG. 6.

The external temperature estimation part 36 acquires the instruction value V of the luminosity of the lighting part 27 as a correlation value in S202, when the last correction value Osp is acquired. The external temperature estimation part 36 acquires the instruction value V of luminosity as a correlation value correlated with the heat amount emitted from the lighting part 27 which is a heating element from the correlation value obtain part 35. The correlation value obtain part 35 reads the instruction value V of the luminosity outputted from the control part 30 to the lighting part 27.

The external temperature estimation part 36 sets the target correction value Ot in S203, when the instruction value V of luminosity is acquired. The target correction value Ot changes according to the correlation value, i.e., the instruction value V of luminosity. As the luminosity of the lighting part 27 is higher, the target correction value Ot becomes larger. As the luminosity is lower, the target correction value Ot becomes smaller.

The external temperature estimation part 36 sets the target correction value Ot based on the instruction value V of the luminosity. The relation between the instruction value V of luminosity and the target correction value Ot is memorized by the storage part 37, for example, as a function or a table. In this case, the external temperature estimation part 36 may set the target correction value Ot by considering the heat amount emitted from the whole substrate 26 containing the lighting part 27, not only the instruction value V of luminosity.

The external temperature estimation part 36 calculates the newest temperature correction value Os in S204, when the target correction value Ot is set. That is, the external temperature estimation part 36 calculates the temperature correction value Os using the last correction value Osp acquired in S201, the target correction value Ot set in S203, and the thermal capacity M. The temperature correction value Os computed in S204 is the newest temperature correction value Os computed in the present processing. The external temperature estimation part 36 calculates the temperature correction value Os using Formula 2.

The external temperature estimation part 36 estimates the external temperature To in S205, which is the exterior temperature of the terminal machine 12, using the temperature correction value Os computed in S204. That is, the internal temperature Ti detected by the temperature sensor 33 is corrected with the temperature correction value Os computed in S204, such that the external temperature estimation part 36 estimates the external temperature To. Thereby, the external temperature To is estimated in consideration of change in the thermal value caused by the change in the luminosity of the lighting part 27. The terminal machine 12 controls the air-conditioning unit 11 using the external temperature To presumed by the external temperature estimation part 36 in S205.

The external temperature estimation part 36 memorizes the temperature correction value Os computed in S204 to the storage part 37 as the last correction value Osp which will be used in the next processing (S206). The external temperature estimation part 36 determines whether the supply of the electric power to the terminal machine 12 is turned off (S207). If the external temperature estimation part 36 determines that the supply of the electric power to the terminal machine 12 is turned off (S207: Yes), the last correction value Osp memorized to the storage part 37 in S206 is set as the stop-time correction value Oss to be used by the starting process shown in FIG. 6 (S208). Thereby, the stop-time correction value Oss to be used in the starting process is memorized by the storage part 37, when the supply of the electric power to the terminal machine 12 is turned off. Moreover, the lapsed time obtain part 34 acquires the OFF time when the supply of the electric power to the terminal machine 12 is turned off, and memorizes it to the storage part 37.

When it is determined that the supply of the electric power to the terminal machine 12 is not turned off (S207: No), the external temperature estimation part 36 determines whether the time interval dt passes (S209). When it is determined that the time interval dt has not passed (S209: No), the external temperature estimation part 36 returns to S207, and repeats the processing. Thus, the external temperature estimation part 36 stands by, without changing the temperature correction value Os, and monitors the supply of the electric power to the terminal machine 12 until the time interval dt which is a sampling period passes. The time interval dt is set, for example as about 10 seconds.

When the external temperature estimation part 36 determines that the time interval dt passed (S209: Yes), the external temperature estimation part 36 returns to S202. The external temperature estimation part 36 repeats the processing after S203 using the last correction value Osp memorized to the storage part 37 in S206. That is, the external temperature estimation part 36 updates the temperature correction value Os, when the time interval dt passes.

According to the embodiment, when the supply of electric power is turned on again after the supply of electric power is turned off, the external temperature estimation part 36 calculates the temperature correction value Os according to the lapsed time t after the supply of electric power is turned off. Namely, the external temperature estimation part 36 acquires the temperature correction value Os at that time as the stop-time correction value Oss, when the supply of electric power is turned off. The external temperature estimation part 36 calculates the temperature correction value Os using the stop-time correction value Oss, the lapsed time t and the thermal capacity M. That is, the external temperature estimation part 36 calculates the temperature correction value Os depending on the lapsed time t.

When the supply of electric power is turned off, the lighting part 27 which is a heating element stops emitting heat, and the heat emission amount decreases. Therefore, the temperature around the temperature sensor 33 in the terminal machine 12 decreases with progress of time. The fall in the temperature is dependent on the lapsed time t and the thermal capacity M.

The external temperature estimation part 36 calculates the temperature correction value Os for correcting the internal temperature Ti detected by the temperature sensor 33, in consideration of the heat emission amount which decreases with the lapsed time t, in which the stop-time correction value Oss when the supply of electric power is turned off is an initial value.

Thereby, when the supply of electric power is turned on again, the external temperature estimation part 36 estimates the external temperature To using the temperature correction value Os computed according to the lapsed time t. Therefore, even immediately after turning on the supply of electric power, the temperature detected by the temperature sensor 33 can be accurately corrected.

In a comparison example, a detection temperature is corrected based on a final temperature after the temperature is changed by heat emitted from a heating element. For example, when considering heat emitted from a lighting part, the correction value is set based on a temperature when the amount of heat emitted from the lighting part becomes the maximum. Therefore, the correction value may be too large or too small in a transition period in which the temperature is shifted to the maximum temperature, when the power supply is turned on for a terminal machine, or when a setup of a heating element is changed. As a result, the control accuracy of a controlled object is low in the comparison example, even by correcting the temperature detected by the temperature detector using a correction value, because a disagreement arises between the external temperature and the internal temperature of a casing.

According to the embodiment, the external temperature estimation part 36 calculates the newest temperature correction value Os from the last correction value Osp, the target correction value Ot, and the thermal capacity M. That is, the external temperature estimation part 36 sets the target correction value Ot according to this newest instruction value V of the luminosity correlated with the heat amount emitted from the lighting part 27 which is the heating element acquired at the fixed time interval dt. The external temperature estimation part 36 calculates the newest temperature correction value Os based on the thermal capacity M and the last correction value Osp that is the temperature correction value Os computed in the last processing.

Thus, the external temperature estimation part 36 sets the target correction value Ot from the instruction value V of the luminosity correlated with the heat amount emitted from the lighting part 27 which is a heating element at the fixed time interval dt. The external temperature estimation part 36 calculates the newest temperature correction value Os by correcting the last correction value Osp which was computed in the last processing using the target correction value Ot and the thermal capacity M. Even when the luminosity of the lighting part 27 which is a heating element changes, the newest temperature correction value Os follows the target correction value Ot. Therefore, even when the luminosity of the lighting part 27 which is a heating element is changed, the temperature detected by the temperature sensor 33 can be accurately corrected.

According to the embodiment, the internal temperature Ti detected by the temperature sensor 33 is corrected with the temperature correction value Os calculated based on the thermal capacity M around the temperature sensor 33. Thus, the temperature correction value Os for correcting the internal temperature Ti is computed using the thermal capacity M peculiar to the terminal machine 12 and the instruction value V of the luminosity of the lighting part 27 which is a heating element.

Therefore, a configuration for making air out of the casing 25 to contact with the temperature sensor 33 becomes unnecessary in the terminal machine 12, while the temperature sensor 33 just detects the internal temperature Ti. That is, the temperature correction value Os can be calculated while the temperature sensor 33 in the terminal machine 12 does not contact air out of the casing 25. Thereby, the casing 25 has no hole for flowing air between inside and outside of the casing 25. Therefore, the design of the casing 25 is improved in the flexibility and the appearance.

Such changes and modifications are to be understood as being within the scope of the present disclosure as defined by the appended claims.

What is claimed is:

1. A temperature correcting device that corrects a temperature detected in a terminal machine inputting information into a controlled object, the temperature correcting device comprising:
a power supply that turns on or off electric power supplied to the terminal machine;
a lapsed time obtain part that acquires a lapsed time after the power supply turns off a supply of electric power;
a temperature detector disposed in the terminal machine to detect a temperature inside the terminal machine as an internal temperature; and
an external temperature estimation part that estimates a temperature out of the terminal machine as an external temperature by correcting the internal temperature using a temperature correction value which changes with the lapsed time, wherein
when the supply of electric power is again turned on after the supply of electric power is turned off, the external temperature estimation part calculates the temperature correction value by correcting a stop-time correction value which is the temperature correction value when the supply of electric power is turned off, using the lapsed time and a thermal capacity around the temperature detector in the terminal machine, and
the temperature correction value is based on the stop-time correction value and the lapsed time before the internal temperature becomes equal to the external temperature after the supply of electric power is turned off.

2. A temperature correcting device that corrects a temperature detected in a terminal machine inputting information into a controlled object, the temperature correcting device comprising:
a memory;
a temperature detector disposed in the terminal machine to detect a temperature inside the terminal machine as an internal temperature;
a correlation value obtain part that acquires a correlation value correlated with a heat amount emitted from a heating element disposed in the terminal machine at a fixed time interval; and
an external temperature estimation part that estimates a temperature out of the terminal machine as an external temperature by correcting the internal temperature using a temperature correction value that is based on the correlation value, wherein
the external temperature estimation part acquires the temperature correction value calculated in a last processing as a last correction value,
the external temperature estimation part sets a target correction value according to a newest correlation value of the correlation value obtained from the correlation value obtain part,
the external temperature estimation part calculates the temperature correction value as a newest temperature correction value based on the last correction value, the target correction value, and a thermal capacity around the temperature detector, and
the thermal capacity is a predetermined value that is specific to the terminal machine, and the predetermined value of the thermal capacity is stored in the memory.

3. The temperature correcting device according to claim 2, wherein the heating element has a lighting part that illuminates a display part of the terminal machine.

* * * * *